July 5, 1949.  J. E. WRAY  2,475,119
MOVABLE ELEMENT CONTROLLING MECHANISM
Filed Aug. 23, 1944  2 Sheets-Sheet 1
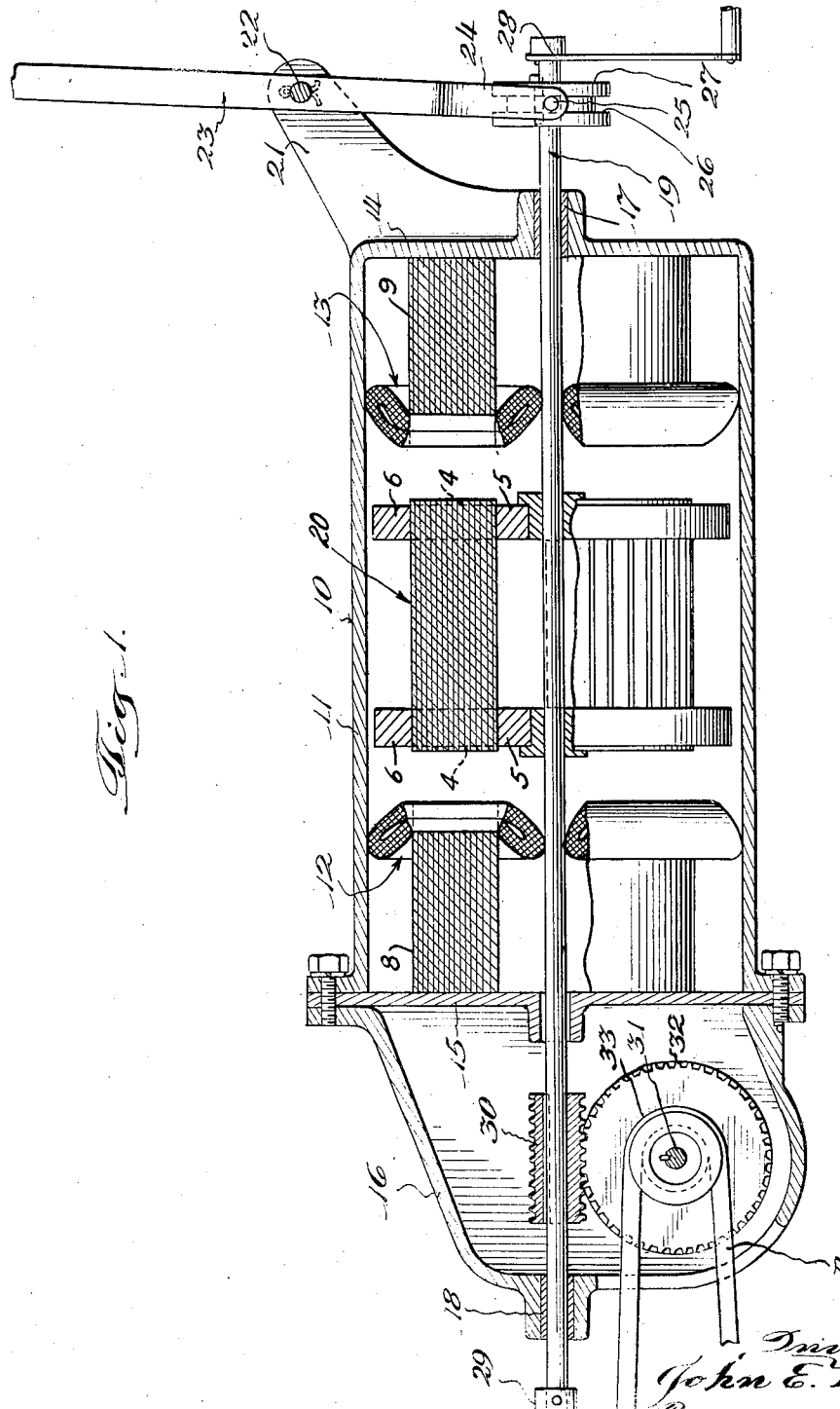

July 5, 1949.  J. E. WRAY  2,475,119
MOVABLE ELEMENT CONTROLLING MECHANISM
Filed Aug. 23, 1944  2 Sheets-Sheet 2
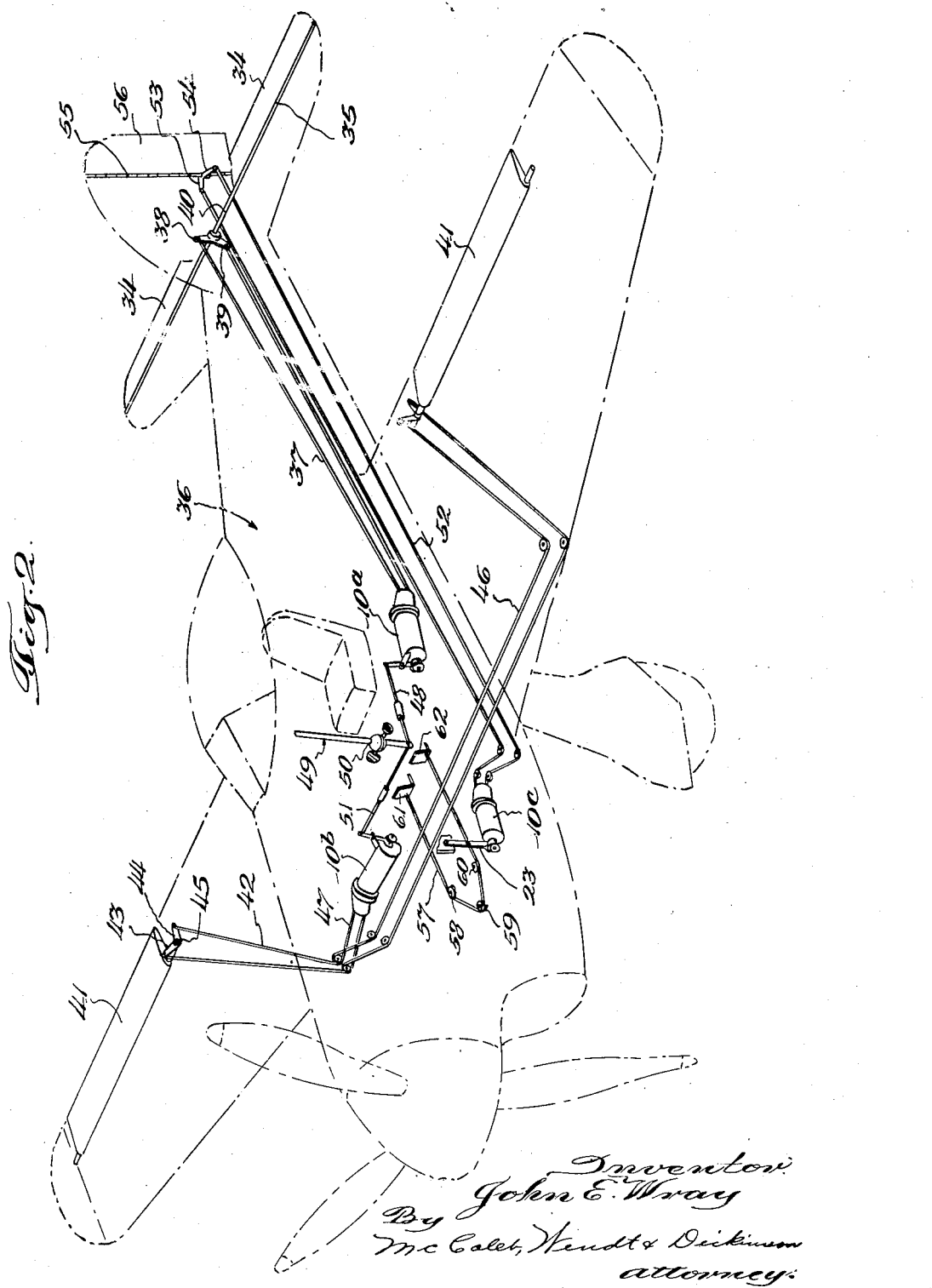

Patented July 5, 1949

2,475,119

UNITED STATES PATENT OFFICE 2,475,119

MOVABLE ELEMENT CONTROLLING MECHANISM

John E. Wray, Evanston, Ill.

Application August 23, 1944, Serial No. 550,821

6 Claims. (Cl. 172—36)

1

The present invention relates to controlling mechanism and is particularly concerned with mechanism of the type adapted to be used to amplify movement at the output of the mechanism and to provide a controlled torque throughout a relatively wide amplitude of movement which is adapted to be controlled manually by the operator with a minimum amount of effort.

While the mechanism may be utilized for controlling various types of devices, its principal application is preferably in the directional control systems of airplanes. In the directional control systems used in the airplanes of the prior art the controlling devices have the disadvantage of a relatively small range of movement of the airplane controlling surfaces such as is realized by a simple system of levers or the pilot controls the movable elements of electric motors without receiving any sensory indication of the relative stiffness of the controls.

One of the objects of the present invention is the provision of an improved mechanism for controlling the movement of the control surfaces of the airplane by means of which a wide range of movement of these controlling surfaces may be secured with a moderate effort on the part of the operator while still giving the operator a sensory indication of the effect of his controlling action which indication is provided by the relative stiffness of the controlling lever at any time.

Another object of the invention is the provision of an improved controlling mechanism for the controlling surfaces of airplanes by means of which a small force acting through a relatively small distance on the manual controlling lever may be amplified into a relatively large force acting through a large distance so that the operator may readily control manually the controlling surfaces of relatively large airplanes with a minimum amount of effort.

Another object of the invention is the provision of an improved electro-mechanical controlling system for the controlling surfaces of airplanes which is simple, capable of economical manufacture, adapted to be used for a long period of time without possibility of failure, and which may be operated with a minimum amount of physical effort to control the controlling elements of airplanes which require the application of a relatively large force.

Other objects and advantages of the invention will become apparent from the following description and the accompanying drawings in which similar characters of reference indicate similar parts throughout the several views.

2

Referring to the drawings, of which there are two sheets:

Fig. 1 is an axial sectional view taken on a plane passing through the axis of the electro-mechanical controlling device showing the details of construction of this device; and Fig. 2 is a diagrammatic view in perspective showing the application of the system to the various controlling elements of one type of airplane.

Referring to Fig. 1, 10 indicates in its entirety one of the electro-mechanical controlling devices which is shown diagrammatically in this figure. This device includes a housing 11 of suitable metal which encloses fixed windings 12, 13, respectively provided with suitable cores 8 and 9 of magnetic material, and the windings 12, 13 are of the three-phase type so that the application of three-phase current to them results in the production of a rotating magnetic field.

The magnetic field provided by the winding 12 rotates in the opposite direction to that provided by the winding 13. For example, the rotating field of the winding 12 may rotate in a clockwise direction and that of the winding 13 may rotate in a counterclockwise direction. The housing 11 may be substantially cylindrical and may be provided with end plates 14 and 15 and gear housing 16.

End plate 14 and gear housing 16 may be provided with bearing bushings 17, 18 for rotatably and slidably receiving the cylindrical shaft 19 which passes through suitable apertures in the windings 12, 13 and end plate 15.

Shaft 19 carries intermediate the two windings 12 and 13 in the housing 11, a rotor 20 which is keyed to the shaft 19 and secured against axial movement on the shaft. The rotor 20 is suitably constructed with radial conductor bars 4 and accompanying end rings 5 and 6 at its opposite ends so that when it comes into proximity to either of the windings 12 or 13, a torque is produced in the rotor 20, causing it to rotate in the direction corresponding to that of the rotating field of the winding to which it may be closer. At an intermediate position, as shown in Fig. 1, the torque effect of the rotating fields of windings 12 and 13 is zero due to the fact that the two torques are balanced.

The housing 11 may carry a suitable extension 21 which has a stub shaft 22 for pivotally supporting the manual control lever 23, and lever 23 is provided at its lower end with a fork 24 the two legs of which have trunnions 25 extending into the complementary groove 26 of a pulley 27 which is fixedly secured on the shaft 19 against axial or rotative movement relative to the shaft.

For emergencies, an auxiliary hand crank 28 may be provided by means of which the shaft 19 may be rotated by the operator to move the controlling elements of the airplane but the crank 28 is preferably removable.

The shaft 19 is of sufficient length so that it may be kept in its guides while the rotor 20 is moved into proximity with either the winding 12 or winding 13 and it is provided with suitable stops one of whch may be the pulley 27 and the other a thrust collar 29 for preventing the rotor from ever contacting windings 12 or 13.

Shaft 19 bears a worm 30 within the gear housing 16, the worm 30 being fixedly secured by keys or other suitable means against axial or rotative movement relative to the shaft 19 so that worm 30 must move axially with the shaft and it must rotate with the shaft.

The housing 16 has suitable bearings for supporting a transverse shaft 31 which carries a worm gear 32 and a V-pulley 33 and the V-pulley is adapted to receive the cable B which is exemplary of various cables connecting these controlling devices 10 with the elements of the airplane to be controlled thereby.

One of these controlling devices is preferably employed for each of the separately controllable elements of the airplane as, for example, the device 10a may be used for controlling the elevators 34 which are pivotally mounted on the tail structure for pivotal movement about a horizontal axis 35. For this purpose the mechanism 10a is fixedly mounted at an appropriate point in the fuselage 36 and the cable 37 may pass about its pulley 33 and may have its ends secured to the oppositely extending crank arms 38, 39 carried by shaft 40 which is fixedly secured to the elevators 34. As the pulley 33 rotates in one or the other direction, the cable 37 is moved over the pulley and it causes the shaft 40 to rotate to move the elevators 34 upward or downward as the case may be.

If it is desirable that the ailerons 41, 41 be controlled simultaneously with the elevators 34, they may be controlled by means of another mechanism 10b which is provided with cables 42 connected to the crank arms 43, 44 for actuating the shaft 45 that moves each aileron 41. The cable 46 which controls the other aileron 41 may be connected to the cable 42 in such manner that both the cables 42 and 46 are actuated simultaneously through the cable 47 to which they are joined.

The controlling device 10a is arranged axially of the fuselage 36 and connected by link 48 to the lower end of manual control lever 49 which is mounted for universal movement by means of a suitable universal joint 50. The controlling device 10b is arranged transversely of the fuselage 36 and is connected by link 51 to the lower end of manual lever 49.

Thus a lateral movement of the lever 49 effects a control of the ailerons 41 which are mounted to move in opposite directions for turning movement while a forward or backward movement of the controlling lever 49 raises or depresses the elevators 34 in the manner in which these elements are customarily controlled.

A third controlling mechanism 10c may be provided with a suitable cable 52 which is connected to the crank arms 53, 54 for actuating the shaft 55 that controls the movement of the rudder 56. In this case the lever 23 of the mechanism 10c is controlled by means of an auxiliary cable 57 which passes over pulleys 58—60 and has its ends connected to the foot pedals 61, 62 in such manner that the depression of one foot pedal causes the other to raise and the feet of the operator may be used to turn the rudder to the right or to the left in the usual manner in which this element is controlled.

I desire it to be understood that the foregoing is merely a diagrammatic illustration of one mode of connecting my controlling electro-mechanical mechanism in the control system of an airplane and many other modes of its connection may be used.

The operation of my controlling mechanism is as follows: When the lever 23 is moved directly manually or through the intermediary of foot pedals or other levers, it may be moved forward, that is, to the left in Fig. 1, or backward, that is to the right. A forward movement of lever 23 (Fig. 1) causes the rotor 20 to come under the influence of the rotating field of the winding 13 and may cause the shaft to rotate in a clockwise direction, carrying with it the worm 30 which drives the gear wheel 32 in such direction as, for example, to tilt the elevators 34 downward, causing the plane to dive.

The worm 30 reacts axially on the shaft 19 as it drives the worm gear 32 and this axial force is resisted through the trunnions 25 and pulley 27 by the operator holding the lever 23 and thus the operator has a direct sensory indication of the stiffness of the controlling elements of the airplane which are being moved. This sensory indication continues as long as the controlling elements of the airplane are held in anything but neutral position as the pressure of the air on these surfaces tends to force the controlling elements back to neutral position and this force is transmitted backward through the cable to the pulley 33, worm 30, shaft 19 to handle 23. Rotation of the shaft continues as long as the handle is held out of neutral position, or until the forces exerted on the controlling element of the airplane are counterbalanced by the force exerted by the rotor on the element of the airplane.

In order to move the controlling element of the airplane in the opposite direction, it is necessary to pull the lever 23 backward when the rotor 20 will come under the influence of the rotating field of winding 13 and the shaft 19 will be rotated in the opposite direction. The worm 30 and gear 32, constituting an irreversible mechanism, the force applied by air pressure to the controlling elements of the airplane cannot cause the shaft 19 to rotate but this force can move the shaft in an axial direction so that the relative stiffness of the controls is always felt by the operator in the manual control lever 23 or the devices that are connected to it, such as the lever 49.

I desire it to be understood that various types of connecting control systems, such as control cables attached to a drum, push rods, levers or hydraulic systems, may be used intermediate the controlling elements of the airplane and the electro-mechanical devices 10 of my invention.

The rotor preferably has a low moment of inertia and the rotating fields preferably have a high angular velocity, so that the response of the element of the airplane to the lever will be with a minimum time lag.

It should be understood of course that the extent to which any control element of the airplane is moved, depends upon the force applied by the operator to the lever 23 and upon the speed of the airplane, which effects the forces applied to the elements by wind pressure. Movement of a controlling element continues only until its movement is stalled by opposing force of air pressure.

It will be observed that I have invented an improved electro-mechanical system for controlling the direction determining elements of an airplane by means of which a relatively small force and small movement may be amplified both as to force and movement so as to exert a large force through a wide range of movement on the controlling elements of the airplane.

The controlling device of my invention gives the operator a sensory indication of the relative stiffness of the controls and in an emergency may be actuated by means of any suitable emergency device such as a crank or auxiliary motor.

The present system is relatively simple and therefore it may be constructed economically and it is of great advantage when used in connection with relatively large airplanes, the controlling elements of which require considerable power for their actuation.

One of the most important advantages of my system is that the pilot supplies the force which is applied to the controls and although this force is amplified both in amount and in the distance through which it is applied, the pilot thus retains the feel of the controls.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A controlling unit for controlling the movable elements of an airplane, comprising an electro-mechanical unit having a support, a shaft rotatably and slidably mounted on said support, a rotor keyed to said shaft, windings located on each side of said rotor for producing constantly rotating fields, and manual means for moving said shaft axially to gradually bring said rotor under the predominating influence of one or the other of said constantly rotating fields, the rotating fields rotating in opposite directions for rotating the rotor when the rotor is brought under the predominating influence of one or the other of said fields and for holding it stationary when under equal influence of both fields, said shaft being provided with rotor drive means for actuating one of the movable elements of an airplane, comprising a worm fixedly secured to said shaft and a worm gear driven by said worm, the reaction of said worm during driving being resisted by said manual means.

2. In an airplane the combination with an airplane having a movable element mounted thereon, a controlling device comprising a rotatable member, electrical means for driving said rotatable member in either of two directions depending upon its axial position relative to said means, said rotatable member being movable axially, manual means for moving said rotatable member axially, and operative mechanical connections through which force is transmitted in both directions between said rotatable member and said movable element, whereby the movable element is moved when said rotatable member is rotated and the force applied to said movable element gives a sensory indication to the operator at said manual means through the thrust applied to said rotatable member axially, said rotatable member comprising a rotor, said rotor being disposed between two oppositely moving rotating magnetic fields.

3. In combination with an airplane having a movable element mounted thereon, a controlling device comprising a rotatable member, electrical means for driving said rotatable member in either of two directions depending upon its axial position relative to said means, said rotatable member being movable axially, manual means for moving said rotatable member axially, and operative mechanical connections between said rotatable member and said movable element, whereby the movable element is moved when said rotatable member is rotated and the force applied to said movable element gives a sensory indication to the operator at said manual means through the thrust applied to said rotatable member axially, said operative mechanical connections including a worm on said shaft and a worm gear driven thereby.

4. In an airplane the combination of a supporting frame with a rudder, a controlling mechanism for said rudder including a rotor mounted on a shaft, said shaft being mounted for rotation and reciprocation, windings disposed on each side of said rotor and adapted to provide two simultaneously rotating fields rotating in opposite directions, control means for moving said shaft axially relative to said fields and operative mechanical connections between said shaft and said rudder, whereby the rudder may be moved in either direction depending on the magnetic field to which said rotor is predominantly subjected through the axial movement of said shaft, said connections comprising a worm on said shaft and a worm gear driven by said worm whereby the thrust on said shaft due to said worm is adapted to provide the operator with a sensory indication of the stiffness of the controls.

5. In an airplane, the combination of a supporting frame with an elevator, a controlling mechanism for said elevator comprising a member having a shaft and a rotor mounted on said shaft, said shaft being mounted for rotation and reciprocation, windings on each side of said rotor for providing two oppositely and simultaneously rotating magnetic fields, and operative mechanical connections between said shaft and said elevator, whereby the movement of said shaft axially into the predominating influence of one or the other of said rotating fields is adapted to cause the rotation of the shaft and the movement of the elevator in a predetermined direction, said operative mechanical connections comprising a worm on said shaft and a worm gear actuated by said worm, the thrust of said worm giving the operator a sensory indication of the stiffness of the controls.

6. In an airplane, the combination of a supporting frame with an aileron, a controlling unit for said aileron comprising a member provided with a rotor mounted on a shaft, said shaft being mounted for rotation and reciprocation, windings on opposite sides of said rotor for providing oppositely and simultaneously rotating magnetic fields, operative mechanical connections between said shaft and said aileron whereby rotation of the shaft causes movement of the aileron, the axial movement of said shaft bringing said rotor into the predominating influence of one or the other of said rotating fields to cause rotation in one or the other direction and to produce a predetermined movement of said aileron, said operative mechanical connections including a worm on said shaft and a worm gear, said worm causing a thrust which is transmitted to the operator through said shaft to indicate the stiffness of the controls.

JOHN E. WRAY.

REFERENCES CITED

The following references are of record in the file of this patent:

UNITED STATES PATENTS

| Number | Name | Date |
|---|---|---|
| 803,322 | Bacon | Oct. 31, 1905 |
| 1,545,433 | Lee et al. | July 7, 1925 |
| 1,605,796 | Tanzler | Nov. 2, 1926 |
| 1,904,801 | Plutino | Apr. 18, 1933 |
| 1,909,581 | H'Doubler | May 16, 1933 |
| 2,270,156 | Andrieu | Jan. 13, 1942 |
| 2,271,207 | Rhein | Jan. 27, 1942 |

FOREIGN PATENTS

| Number | Country | Date |
|---|---|---|
| 682,467 | Germany | Oct. 14, 1939 |